(12) United States Patent
Manuguri et al.

(10) Patent No.: US 9,264,313 B1
(45) Date of Patent: Feb. 16, 2016

(54) SYSTEM AND METHOD FOR PERFORMING A SERVICE DISCOVERY FOR VIRTUAL NETWORKS

(71) Applicant: VMware, Inc., Palo Alto, CA (US)

(72) Inventors: Subrahmanyam Manuguri, San Jose, CA (US); Anirban Sengupta, Saratoga, CA (US); Andre Khan, San Ramon, CA (US)

(73) Assignee: VMware, Inc., Palo Alto, CA (US)

( * ) Notice: Subject to any disclaimer, the term of this patent is extended or adjusted under 35 U.S.C. 154(b) by 127 days.

(21) Appl. No.: 14/069,299

(22) Filed: Oct. 31, 2013

(51) Int. Cl.
*H04L 12/28* (2006.01)
*H04L 12/24* (2006.01)

(52) U.S. Cl.
CPC .................................... *H04L 41/12* (2013.01)

(58) Field of Classification Search
None
See application file for complete search history.

(56) References Cited

U.S. PATENT DOCUMENTS

| | | | |
|---|---|---|---|
| 6,636,499 B1 * | 10/2003 | Dowling | 370/338 |
| 2013/0227558 A1 * | 8/2013 | Du et al. | 718/1 |
| 2014/0204803 A1 * | 7/2014 | Nguyen et al. | 370/255 |

* cited by examiner

*Primary Examiner* — Frank Duong (57) ABSTRACT

A system and method for performing a service discovery on a distributed computer system includes obtaining information of a service that is provided by a host computer in the distributed computer system and embedding the information into a Link Layer Discovery Protocol (LLDP) data frame to be transmitted from the host computer to another component of the distributed computer system.

18 Claims, 9 Drawing Sheets

SYSTEM AND METHOD FOR PERFORMING A SERVICE DISCOVERY FOR VIRTUAL NETWORKS

BACKGROUND

Virtualization can associate computing resources with network services. For example, virtual compute instances, such as virtual machines (VMs), can interact with physical networking equipments providing load balancing service, firewall service, etc., physical equipments providing high level application services, such as, web proxy, Simple Mail Transfer Protocol (SMTP) proxy, single sign-on proxy, Web Cache Communication Protocol (WCCP) proxy, Internet Content Adaptation Protocol (ICAP) proxy, virtual network appliances providing similar network services to physical networking equipments, and virtual application services that run on an off-the-shelf x86 blade servers.

Virtualization can bring challenges to providers and users of data centers. For example, the interaction between virtual compute instances and resources may require discovery and configuration of the services at management stations in the network. Service discovery and configuration techniques for distributed computer systems with service-consuming clients, such as VMs, are important to ensure that the clients are operating at desired or target levels. However, service discovery and configuration may be a resource and capital intensive operation as it requires multiple organizations inside an enterprise and across different enterprises to interoperate and cooperate with each other and work with all the equipment and virtualization service vendors. In addition, maintaining the service configuration in view of the dynamic nature of the data center service and policy deployment is an increasingly difficult task.

SUMMARY

A system and method for performing a service discovery on a distributed computer system includes obtaining information of a service that is provided by a host computer in the distributed computer system and embedding the information into a Link Layer Discovery Protocol (LLDP) data frame to be transmitted from the host computer to another component of the distributed computer system.

In an embodiment, a method for performing a service discovery for a distributed computer system involves obtaining information of a service that is provided by a host computer in the distributed computer system and embedding the information into an LLDP data frame to be transmitted from the host computer to another component of the distributed computer system.

In an embodiment, a computer-readable storage medium contains program instructions for performing a service discovery on a distributed computer system. Execution of the program instructions by one or more processors causes the one or more processors to perform steps include obtaining information of a service that is provided by a host computer in the distributed computer system and embedding the information into an LLDP data frame to be transmitted from the host computer to another component of the distributed computer system.

In an embodiment, a computer system for performing a service discovery on a distributed computer system includes a processor and a service discovery module operably connected to the processor. The service discovery module is configured to obtain information of a service that is provided by a host computer in the distributed computer system and embed the information into an LLDP data frame to be transmitted from the host computer to another component of the distributed computer system.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
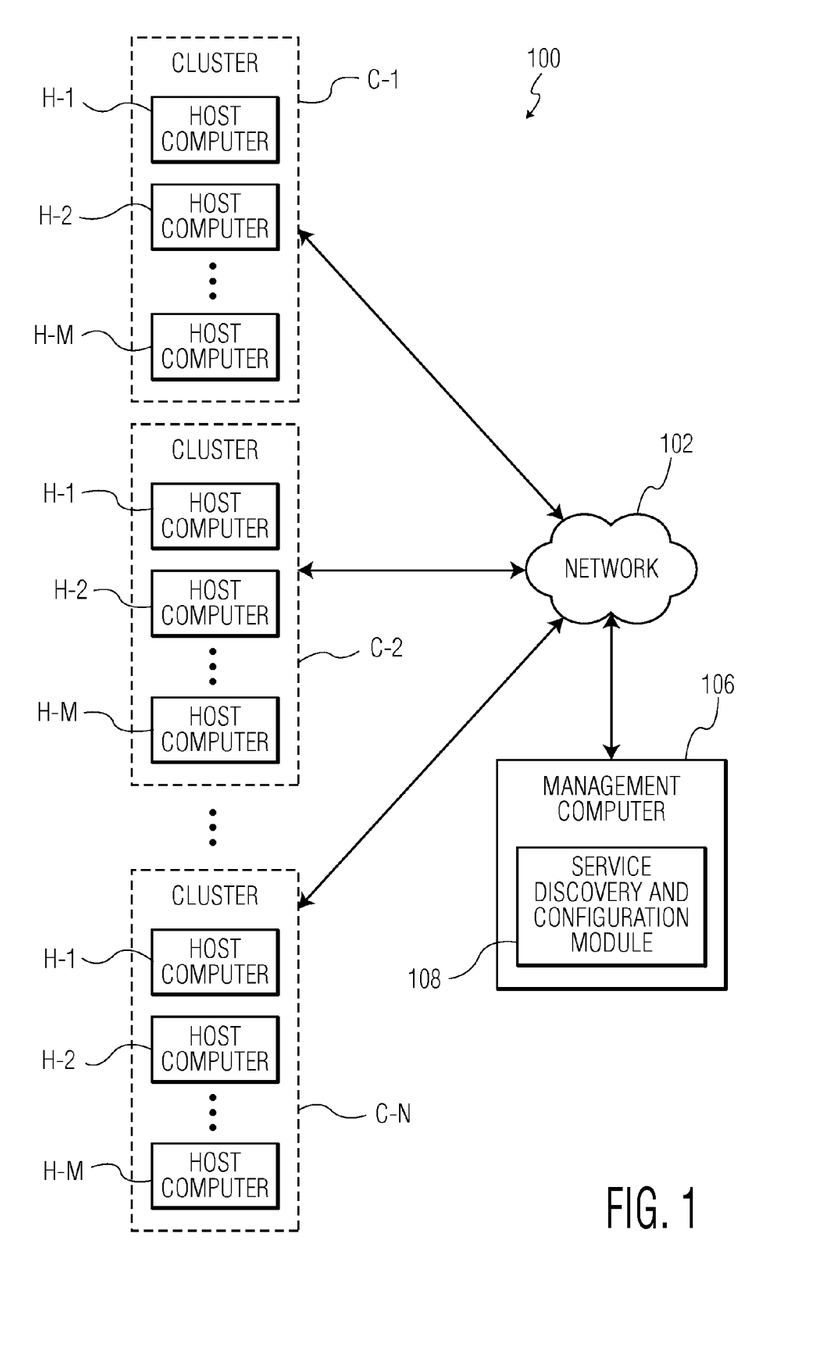
FIG. 1 is a block diagram of a distributed computer system in accordance with an embodiment of the invention.

Turning now to FIG. 1, a distributed computer system 100 in accordance with an embodiment of the invention is shown. The distributed computer system may be, for example, a computer network system that hosts virtual networks. As shown in FIG. 1, the distributed computer system includes a network 102, clusters C-1, C-2 . . . C-N of host computers (where N is a positive integer), and a management computer 106 with a service discovery and configuration module 108. The exact number of host computer clusters included in the distributed computer system can be any number of clusters from one to tens of clusters or more. The host computers of the different clusters and the management computer are connected to the network. Thus, each of the host computers in the clusters and the management computer are able to communicate via the network. Consequently, any process running on any of the host computers and the management computer may also communicate with each other via the network.

In the illustrated embodiment, each of the clusters C-1, C-2 . . . C-N includes a number of host computers H-1, H-2 . . . H-M (where M is a positive integer). The host computers can be assigned to the host computer clusters based on predefined criteria, which may include geographical and/or logical relationships between the host computers. The number of host computers included in each of the clusters can be any number from one to several hundred or more. In addition, the number of host computers included in each of the clusters can vary so that different clusters can have different number of host computers. The host computers are physical computer systems that host or support one or more clients so that the clients are executing on the physical computer systems. As used herein, the term "client" is any software entity that can run on a computer system, such as a software application, a software process or a virtual machine (VM). The host computers may be servers that are commonly found in data centers. As an example, the host computers may be servers installed in one or more server racks. Typically, the host computers of a cluster are located within the same server rack. In some embodiments, the host computers are blade servers in data centers.

Figure 2:
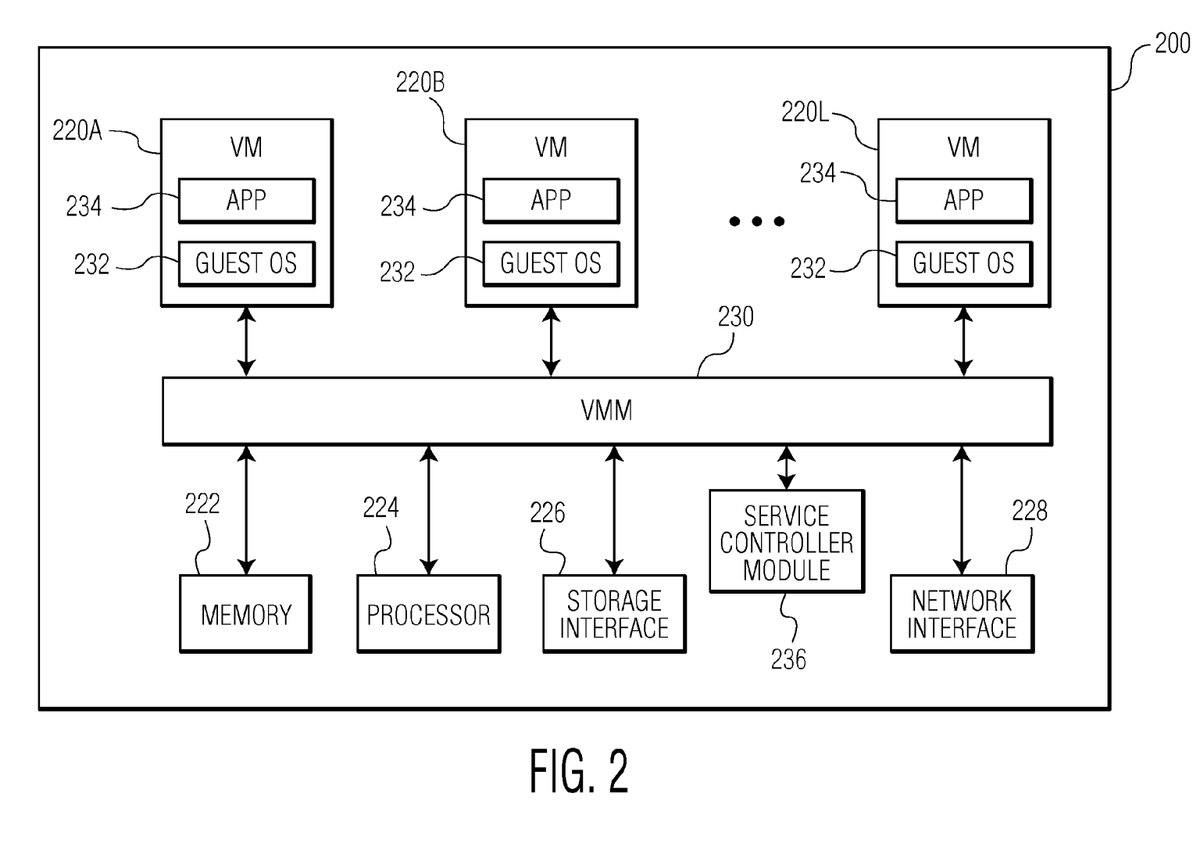
FIG. 2 is a block diagram of a host computer in accordance with an embodiment of the invention.

Turning now to FIG. 2, components of a host computer 200 that is representative of the host computers H-1, H-2 . . . H-M in the clusters C-1, C-2 . . . C-N in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs. The number of VMs supported by the host computer can be anywhere from one to more than one hundred. The VMs share at least some of the hardware resources of the host computer, which include system memory 222, one or more processors 224, a storage interface 226, and a network interface 228. The system memory, which may be random access memory (RAM), is the primary memory of the host computer. The processor can be any type of a processor, such as a central processing unit (CPU) commonly found in a server. The storage interface is an interface that allows that host computer to communicate with the storage 104. As an example, the storage interface may be a host bus adapter or a network file system interface. The network interface is an interface that allows the host computer to communicate with other devices connected to the network 102. As an example, the network interface may be a network adapter.

In the illustrated embodiment, the VMs 220A, 220B . . . 220L run on top of a virtual machine monitor (VMM) 230, which is a software interface layer that enables sharing of the hardware resources of the host computer 200 by the VMs. However, in other embodiments, one or more of the VMs can be nested, i.e., a VM running in another VM. For example, one of the VMs may be running in a VM, which is also running in another VM. The virtual machine monitor may run on top of the host computer's operating system or directly on hardware of the host computer. In some embodiments, the virtual machine monitor runs on top of a hypervisor that is installed on top of the hardware components of the host computer. With the support of the virtual machine monitor, the VMs provide virtualized computer systems that give the appearance of being distinct from the host computer and from each other. Each VM includes a guest operating system (OS) 232 and one or more guest applications (APP) 234. The guest operating system is a master control program of the respective VM and, among other things, the guest operating system forms a software platform on top of which the guest applications run. Similar to any other computer system connected to the network 102, the VMs 220A, 220B . . . 220L are able to communicate with other computer systems connected to the network using the network interface 228 of the host computer 200. In addition, the VMs are able to access a storage using the storage interface 226 of the host computer.

The host computer 200 also includes a service controller module 236 that operates as a part of a service management system, such as a distributed service management system, to manage one or more virtual and/or physical services provided by the host computer 200. In some embodiments, the service controller module 236 manages virtual services provided by the VMs 220A, 220B . . . 220L. The service controller module in each host computer cooperatively operates with the service controller modules in the other host computers of the distributed computer system 100 to perform service broadcast and discovery. Although the service controller module is illustrated in FIG. 2 as being separate from the virtual machine monitor 230 and the network interface 228, the service controller module may be implemented as part of the virtual machine monitor or the network interface. In some embodiments, the service controller module is implemented as software programs running on the host computer. However, in other embodiments, the service controller module may be implemented using any combination of software and hardware.

Turning back to FIG. 1, the network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and Hyper-SCSI.

The management computer 106 operates to monitor and manage the host computers H-1, H-2 ... H-M of the clusters C-1, C-2 ... C-N of the distributed computer system 100. In some embodiments, the management computer may be a part of the network 102. The management computer may be configured to manage virtual and/or physical services provided by the host computers H-1, H-2 ... H-M of the clusters C-1, C-2 ... C-N. In some embodiments, the management computer manages virtual services provided by clients (e.g., VMs) provided by the host computers H-1, H-2 ... H-M of the clusters C-1, C-2 ... C-N. The management computer may be configured to monitor the current configurations of the host computers and the clients running on the host computers, for example, virtual machines (VMs). The monitored configurations may include hardware configuration of each of the host computers, such as CPU type and memory size, and/or software configurations of each of the host computers, such as operating system (OS) type and installed applications or software programs. The monitored configurations may also include clustering information, i.e., which host computers are included in which clusters. The monitored configurations may also include client hosting information, i.e., which clients, e.g., VMs, are hosted or running on which host computers. The monitored configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients.

The service discovery and configuration module 108 is configured to make service discovery and configuration operations on the distributed computer system 100, including services offered by the host computers H-1, H-2 ... H-M of the clusters C-1, C-2 ... C-N. The service discovery and configuration module may be configured to discover and configure services offered by the host computers H-1, H-2 ... H-M of the clusters C-1, C-2 ... C-N, including services provided by software clients running on these host computers and hardware services offered by components of these host computers. For example, software clients (e.g., VMs) running on the host computers H-1, H-2 ... H-M can provide virtual application services, such as, web proxy services, SMTP proxy services, single sign-on proxy service, WCCP proxy services, ICAP proxy services, and virtual networking services, such as, load balancing services and firewall services. In some embodiments, the service discovery and configuration module is a part of the network 102. The service discovery and configuration module can leverage common protocols that are followed in every data center deployment, such as Link Layer Discovery Protocol (LLDP) and Border Gateway Protocol (BGP), for communication. In one embodiment, the service discovery and configuration module keeps track of objects containing service meta-data and facilitates the exchange of the service meta-data over the network 102. The service meta-data carries information that describes services offered by the host computers H-1, H-2 ... H-M of the clusters C-1, C-2 ... C-N. The service meta-data can be stored and converted from one form to another when the service meta-data crosses the boundaries of different sections of the network without losing the data. The service discovery and configuration module can help network nodes in the network to build the service map over time and provide an efficient way to setup and teardown the services, ability to monitor the services, ability to measure performance and feedback to adjust the configuration dynamically.

Figure 3:
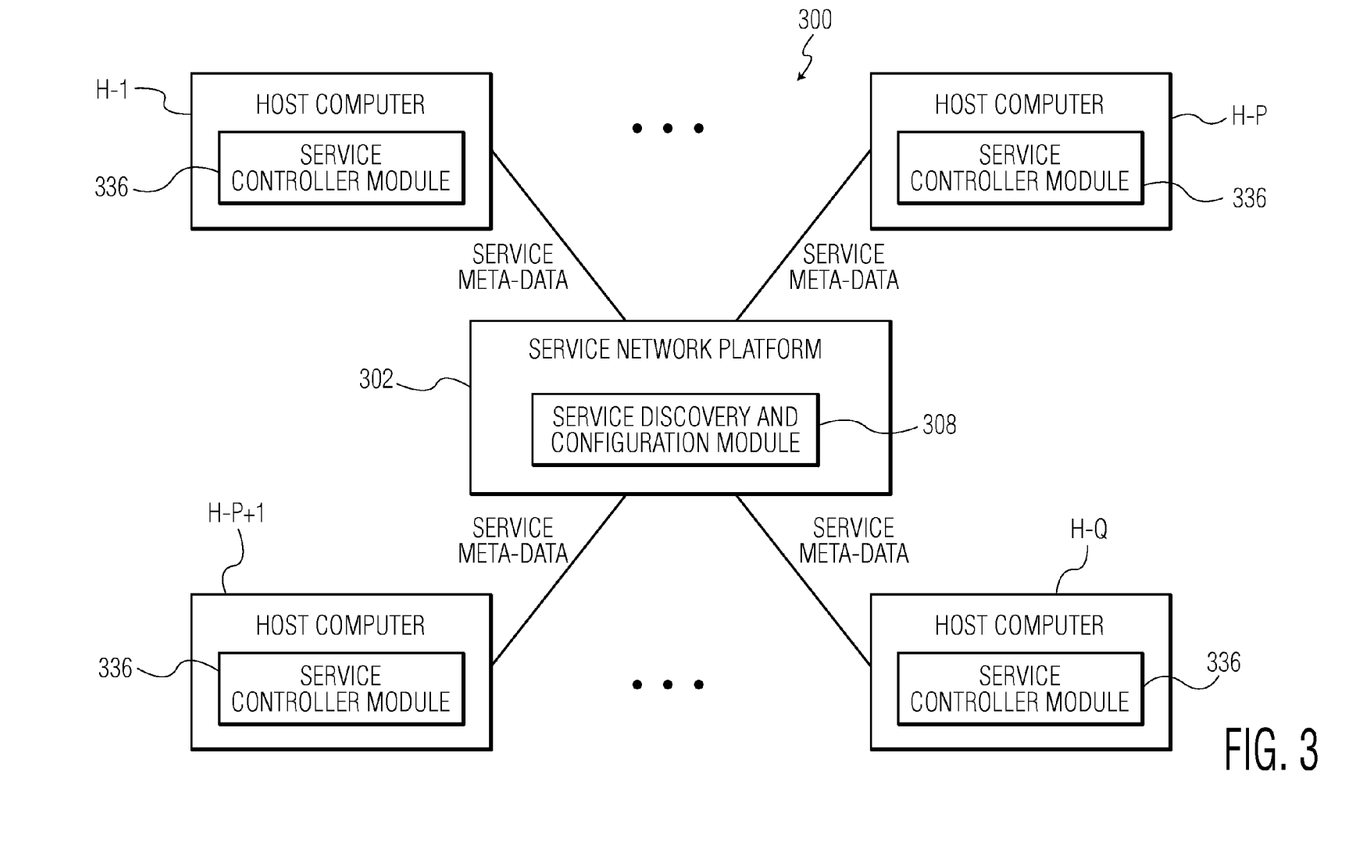
FIG. 3 is a block diagram of an embodiment of the distributed computer system depicted in FIG. 1.

Turning now to FIG. 3, an embodiment of the distributed service system 100 depicted in FIG. 1 is shown. As illustrated in FIG. 3, a distributed service system 300 includes host computers H-1 ... H-P, H-P+1 ... H-Q (P, Q are positive integers) with service controller modules 336 and a service network platform 302 with at least one service discovery and configuration module 308. The host computers H-1 ... H-P, H-P+1 ... H-Q can be located in one or more clusters. The service network platform 302 is an embodiment of the network 102 and the management computer 106. These service controller modules and the service discovery and configuration module can be implemented as software, hardware or a combination of software and hardware. The service controller modules can place service meta-data into communication packets that are sent to other hosts through the service network platform. The service controller modules can leverage communication protocols that are commonly used in network stacks of the hosts. Communication protocols that can be controlled by the service controller modules may include Layer 2 (L2) and Layer 3 (L3) of the seven-layer Open Systems Interconnection (OSI) model of computer networking. Layer 2 is the data link layer, which is responsible for media access control, flow control and error checking. L3 is the network layer, which is responsible for packet forwarding including routing through intermediate routers. In one embodiment, the service controller modules add service meta-data as extensions into standard data frames of Link Layer Discovery Protocol (LLDP) and Border Gateway Protocol (BGP), which are exchanged over the service network platform. The service meta-data may be broken down into a set of Type-Length-Values (TLVs). The service discovery and configuration module can be implemented in the L2 and L3 network boundaries using existing communication protocols that are supported in a datacenter. The service discovery and configuration module can be implemented in various network entities of the service network platform. In some embodiments, the service discovery and configuration module is implemented in a router or a switch.

In an embodiment, the service controller module 336 is a Layer 2 discovery component. The service controller module of a transmitting host computer can add an extension to the existing LLDP implementation. Specifically, the service controller module adds TLV values, which carry service meta-data, to LLDP frames that are carried over a Layer 2 network. The service controller module at a receiving host computer can decode the LLDP frames and locate the added service TLV values. If the service TLV values are found in the LLDP frames, the service database of the service controller module is updated and is made available to the higher layers in the seven-layer OSI model of computer networking. In some embodiments, the service meta-data can be used to make the policy and service deployment decisions.

In another embodiment, the service controller module 336 is a Layer 3 discovery component. The service controller module of a transmitting host computer can add an extension to the existing BGP implementation. Specifically, the service controller module adds TLV values, which carry service meta-data, to BGP frames that are carried over a Layer 3 network. The service controller module at a receiving host computer can decode the BGP frames and locate the added service TLV values. If the service TLV values are found in the BGP frames, the service database of the service controller module is updated and is made available to the higher layers in the seven-layer OSI model of computer networking. In some embodiments, the service controller module enhances existing BGP protocols, for example, by adding new service prefix supported by new service AFI/SAFI, by adding new extended community attribute types to carry service defining TLVs, and/or by redistribution of service prefixes and attribute between BGP and Service Information Base (SIB). The service controller module can enable boundless service discovery and insertion diameter, policy enforcement of services, multi-tenant capable service infrastructure and programmatic interface for services.

The service discovery and configuration module 308 can be used to discover services within the Layer 2 (L2) perimeter as well as Layer 3 (L3) perimeter. In an embodiment, the service discovery and configuration module is implemented as an edge component to convert service meta-data between a Layer 2 database populated by the LLDP protocol and a Layer 3 database read by the BGP protocol and vice versa. By adding the edge component in the network (virtual or physical) boundaries can enable the automatic service discovery across the Layer 2 and Layer 2 cloud boundaries, without requiring additional changes to existing switches or routers in the service network platform 302.

Figure 4:
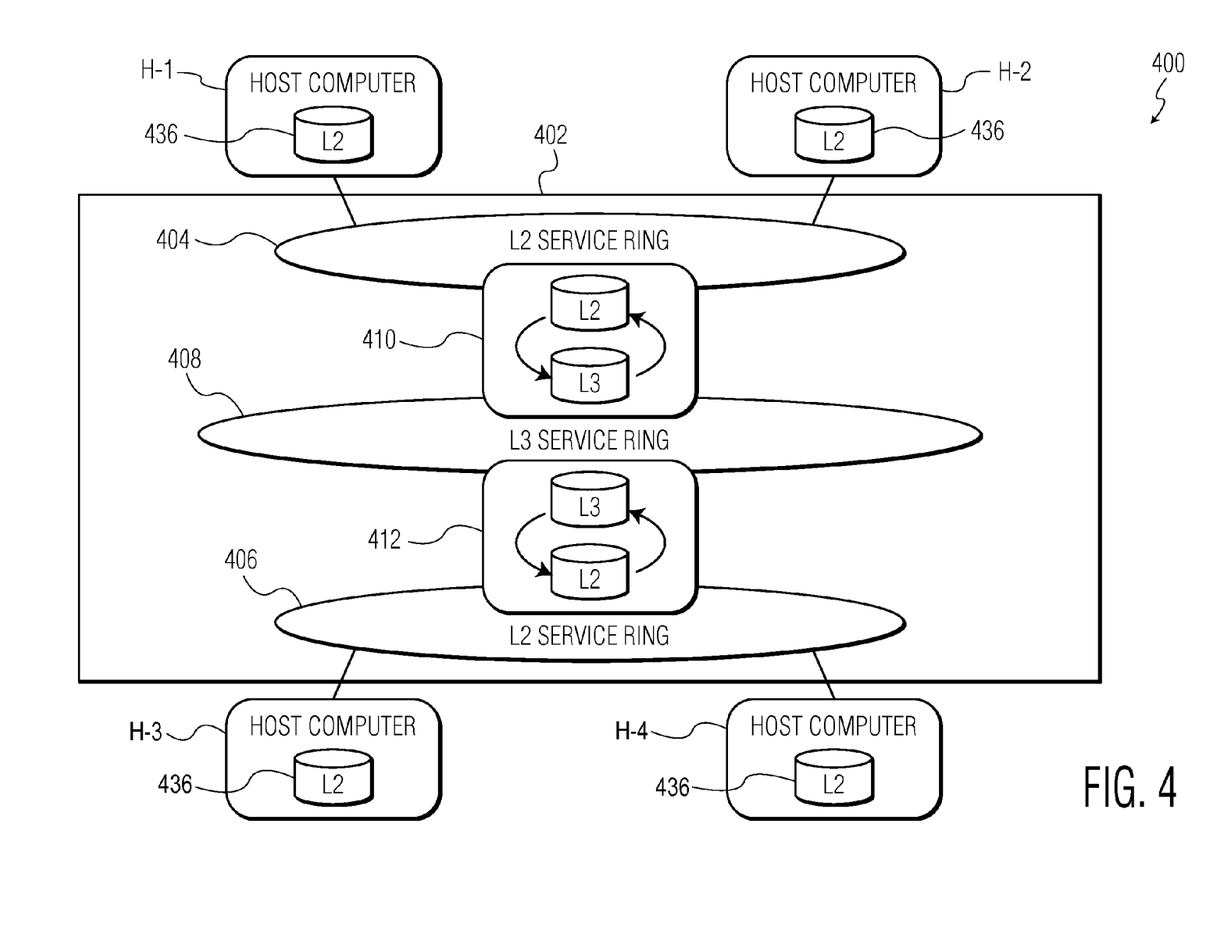
FIG. 4 is a block diagram of an embodiment of the distributed computer system depicted in FIG. 3.

Turning now to FIG. 4, an embodiment of the distributed service system 300 depicted in FIG. 3 is shown. As illustrated in FIG. 4, a distributed service system 400 includes host computers H-1, H-2, H-3, H-4 with Layer 2 service controller modules 436 and a service network platform 402 with two Layer 2 service rings 404, 406, a Layer 3 service ring 408, and two edge components 410, 412 between the Layer 2 service rings and the Layer 3 service ring. In one embodiment, a host computer H-1, H-2, H-3, or H-4 on which a VM is located sends information that describes service(s) provided by the VM over an L2 service ring using LLDP protocol. Other host computers receive this service information and update their service databases. For example, service information that describes one or more services provided by a particular host computer may be embedded into at least one data frame that are transmitted between from the particular host computer to other host computers. The other host computers can decode the data frame to retrieve the service information. The edge component 410 or 412 may convert the service data received from an L2 service ring into database records that can be used by the L3 service ring or converts the service data received from the L3 service ring into database records that can be used by an L2 service ring. The service data is pushed over the L3 service ring and all the L3 end points update their databases.

Figure 5:
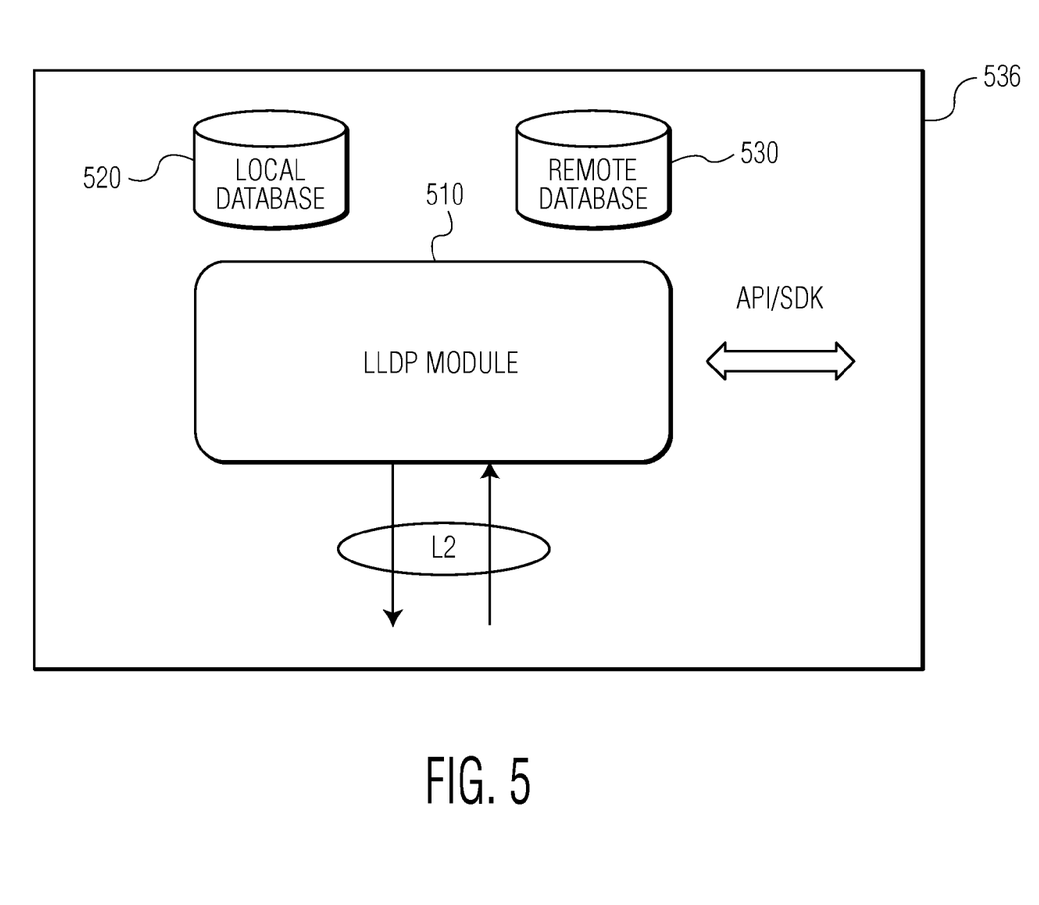
FIG. 5 depicts a service controller module in accordance with an embodiment of the invention.

Turning now to FIG. 5, a service controller module 536 in accordance with an embodiment of the invention is shown. As illustrated in FIG. 5, the service controller module includes an LLDP module 510, a database for local service (local database) 520, and a database for remote service (remote database) 530. The LLDP module can encode and decode an LLDP frame with service specific TLV values. The local database is configured to contain a record of one or more services offered by VMs running on the same host computer in which the service controller module is included. The remote database is configured to contain a record of one or more VMs running on the remote hosts that are learnt through LLDP message exchange. An application programming interface (API)/software development kit (SDK) may be provided for configuration, monitoring and trouble shooting of the LLDP module. In an example operation of the service controller module, the LLDP module adds TLV values that represent services provided by VMs running on the same host computer in which the service controller module is included to an LLDP data frame. The LLDP data frame is carried over an L2 network. The receiving host decodes the LLDP frame and searches for added service TLV values. If the service TLV values are found, the remote database of the receiving host is updated to include the service information.

The Link Layer Discovery Protocol (LLDP) is used for discovering the nodes in an Institute of Electrical and Electronics Engineers (IEEE) 802 Local Area Network (LAN). The Link Layer Discovery Protocol is officially documented in IEEE 802.1AB and is named as "Station and Media Access Control Connectivity Discovery." Essentially features of the LLDP protocol described in the IEEE document may include adverting the connectivity and management information about the local station to adjacent stations on the same 802 LAN, receiving the network management information from adjacent stations on the same 802 LAN, operating with all IEEE 802 access protocols and network media, establishing a network management information schema and object definitions that are suitable for storing connection information about adjacent stations, and/or providing compatibility with IETF PTOPO MIB.

Figure 6:
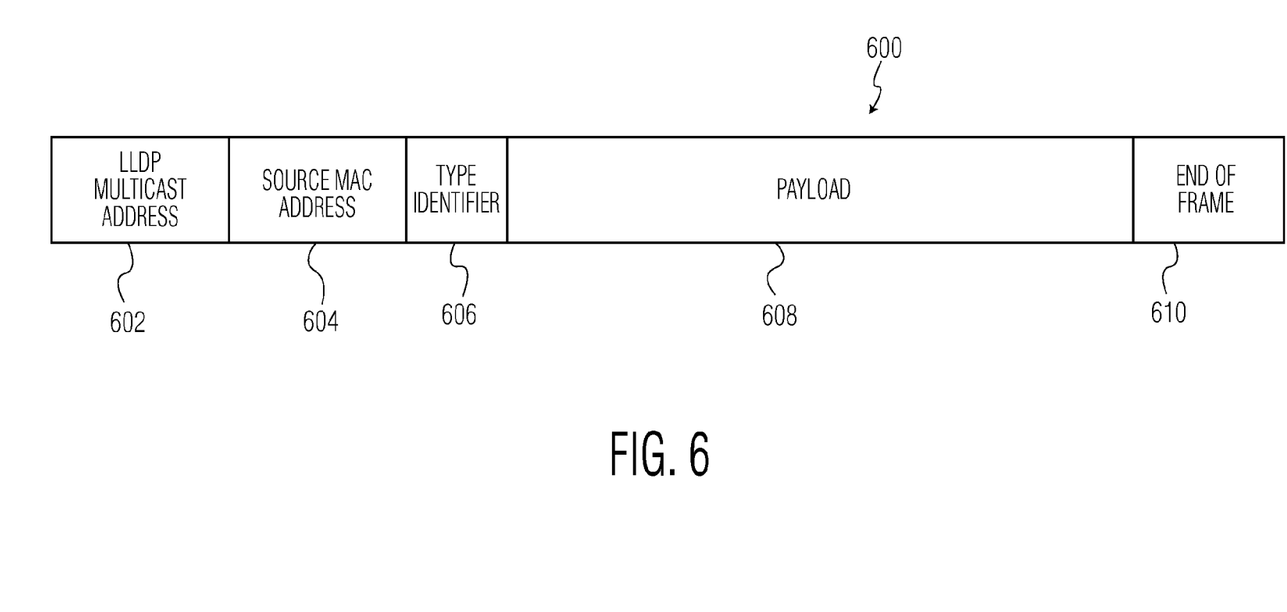
FIG. 6 depicts an LLDP data frame in accordance with an embodiment of the invention.

Turning now to FIG. 6, an LLDP data frame 600 used by a host computer H-1, H-2, or . . . H-M to carry service information in accordance with an embodiment of the invention is shown. As illustrated in FIG. 6, the LLDP frame includes an LLDP multicast address section 602, a source MAC address section 604, a frame type identifier section 606, a payload section 608, and an end of frame section 610. In some embodiments, the LLDP multicast address section has 6 bytes, the source MAC address section has 6 bytes, the frame type identifier section has 2 bytes, the payload section has 1500 bytes, and the end of frame section has 4 bytes.

Figure 7:
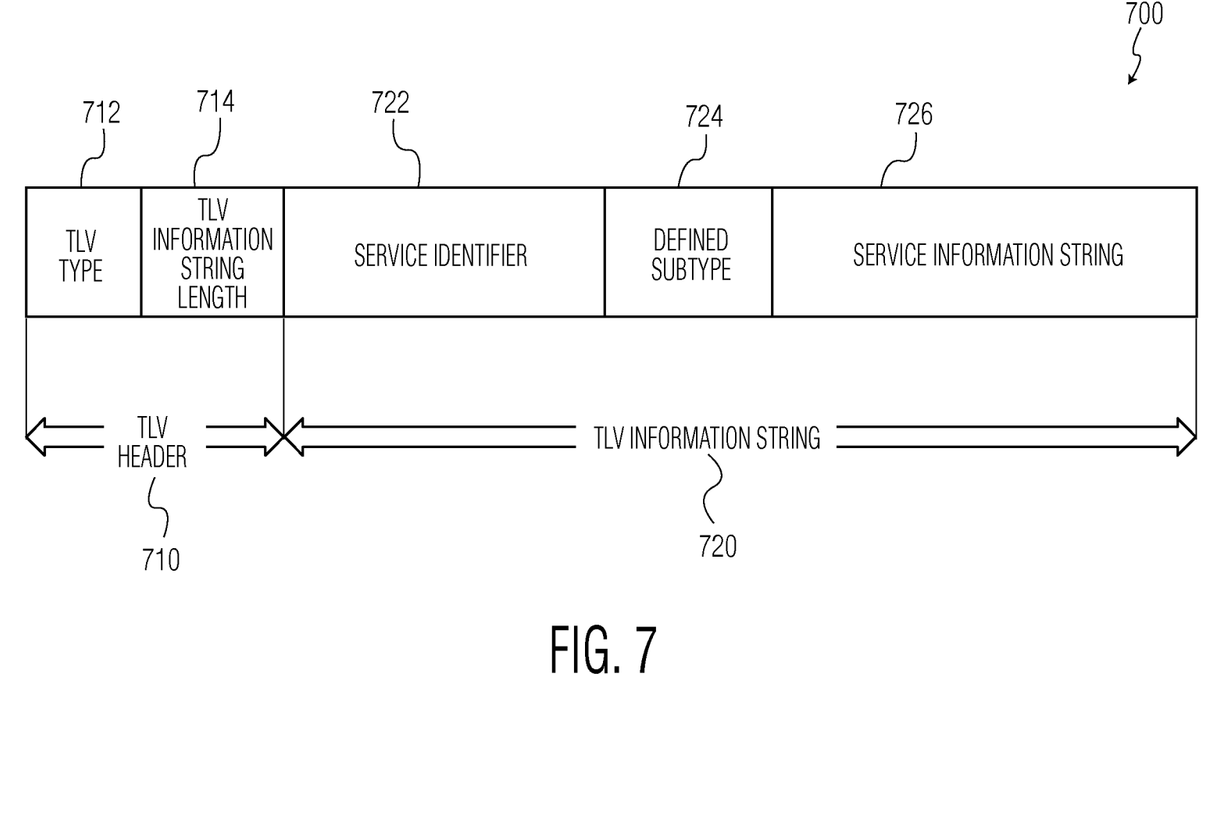
FIG. 7 depicts a TLV extension for an LLDP data frame in accordance with an embodiment of the invention.

The payload section 608 may include data and padding. In some embodiments, the payload section contains extended TLVs for the service discovery. Turning now to FIG. 7, a TLV extension 700 for an LLDP data frame in accordance with an embodiment of the invention is shown. As illustrated in FIG. 7, the TLV extension includes a TLV header 710 and a TLV information string 720. The TLV header includes a TLV type section 712 and a TLV information string length section 714. The TLV information string includes a service identifier section 722, a service subtype section 724 and a service information string 726. In some embodiments, the TLV type section has 7 bits, the TLV information string length section has 9 bits, the service identifier section has 3 bytes, the service subtype section has 1 byte and the service information string has a length that is between zero byte and 507 bytes. In some embodiments, the service subtype is set as 0000 0000.

In an embodiment, the service information string 726 includes a list start segment, an instance type segment, an instance id segment, a service group segment, a service description segment, a sub type digest (SHA1) segment and a list end segment. The list start segment specifies the start of a TLV list. The instance type segment specifies whether the service offered is a virtual service or a physical service. The instance id segment specifies the VM identification number (ID) or Chassis ID of the host computer on which the VM is executed. The service group segment specifies the group name in which the service offered is categorized. The service description segment describes service capability offered. The sub type digest segment describes digest generated for the included sub types. The list end segment represents the end of the TLV list. Each of the segments of the organization information string is represented by a TLV string. Some examples of these segments are listed as follows:

List start TLV:
Type: 0000 0001
Length: 0000 0001—1 byte
Value: 1111 1111

Instance type TLV:
Type: 0000 0010
Length: 0000 0001—1 byte
Value: 0101 0000—P (physical)
    0101 0110—V (virtual)
Instance Id TLV:
Type: 0000 0011
Length: 0000 1000 (8 bytes)
Value: xxxx xxxx xxxx xxxx xxxx xxxx xxxx xxxx (VM Id or Chassis Id) (each xxxx represents one byte)
Service Group TLV:
Type: 0000 0100
Length: 0000 1000 (8 bytes)
Value: xxxx xxxx xxxx xxxx xxxx xxxx xxxx xxxx (Service group Id)
Service description TLV:
Type: 0000 0101
Length: 0010 0000 (64 bytes)
Value: xxxx xxxx xxxx xxxx xxxx xxxx xxxx xxxx xxxx
    xxxx xxxx xxxx xxxx xxxx xxxx xxxx xxxx xxxx xxxx
    xxxx xxxx xxxx xxxx xxxx xxxx xxxx xxxx xxxx xxxx
    xxxx xxxx xxxx xxxx xxxx xxxx xxxx xxxx xxxx xxxx
    xxxx xxxx xxxx xxxx xxxx xxxx xxxx xxxx xxxx xxxx
    xxxx xxxx xxxx xxxx xxxx xxxx xxxx xxxx xxxx xxxx
    xxxx xxxx xxxx xxxx xxxx
SHA1 TLV:
Type: 1111 1111
Length: 0001 0100 (40 byte)
Value: xxxx xxxx xxxx xxxx xxxx xxxx xxxx xxxx xxxx
    xxxx xxxx xxxx xxxx xxxx xxxx xxxx xxxx xxxx xxxx
    xxxx xxxx xxxx xxxx xxxx xxxx xxxx xxxx xxxx xxxx
    xxxx xxxx xxxx xxxx xxxx xxxx xxxx xxxx xxxx xxxx
    xxxx
List End TLV:
Type: 1111 1110
Length: 0000 0001
Value: 1111 1111

In some embodiments, an edge component is included in a host computer or connected to a host computer for communication over an L3 network. The edge component may be implemented as a router or a switch. The edge component can run a modified BGP protocol to send the service information over the L3 network. In one embodiment, the edge component sends service TLVs in the optional path attributes of the UPDATE message with the "transitive" flag set in the Attribute flags. Other edge components can read the transitive flag and forward the optional attributes AS-IS to the BGP peers. Once the UPDATE message is received at an edge component, the BGP message is decomposed and the optional attributes are retrieved from the BGP message. The attributes can be saved into a local database for the later consumption by the LLDP update over the L2 network, which enables the discovery of the services over the L3 perimeter.

Border Gateway Protocol (BGP) allows TCP sessions and other network protocol sessions to be established between network nodes. BGP can be implemented as a finite state machine. States of BGP includes, for example, Idle State, Connect State, Active State, OpenSent State, OpenConfirm State, and Established State. In Established State, a peer can send Update messages to exchange information about each route being advertised to the BGP peer. In some embodiments, a BGP update message includes Unfeasible Routes segment, Withdrawn Routes segment, Total Path Attribute Length segment, Path Attributes segment and Network Layer Reachability segment. Each path attribute may be a service specific TLV value of variable length. The service TLVs will be compatible with the L2 service TLVs and convey the same semantic meaning across the L2 and L3 clouds. Services can be discovered by encapsulating the service TLV in the BGP's UPDATE message's path attributes that runs on the edges, sending the message by setting the transitive flag so that the BGP peer will simply forward it to the next BGP peer. At an edge component, when the message is decoded, the TLV can be read and the corresponding LLDP database can be updated. The updated LLDP database will be synchronized on an L2 cloud by the next LLDP sync update. Any update coming on the LLDP remote database will be up-streamed into an L3 cloud.

Figure 8:
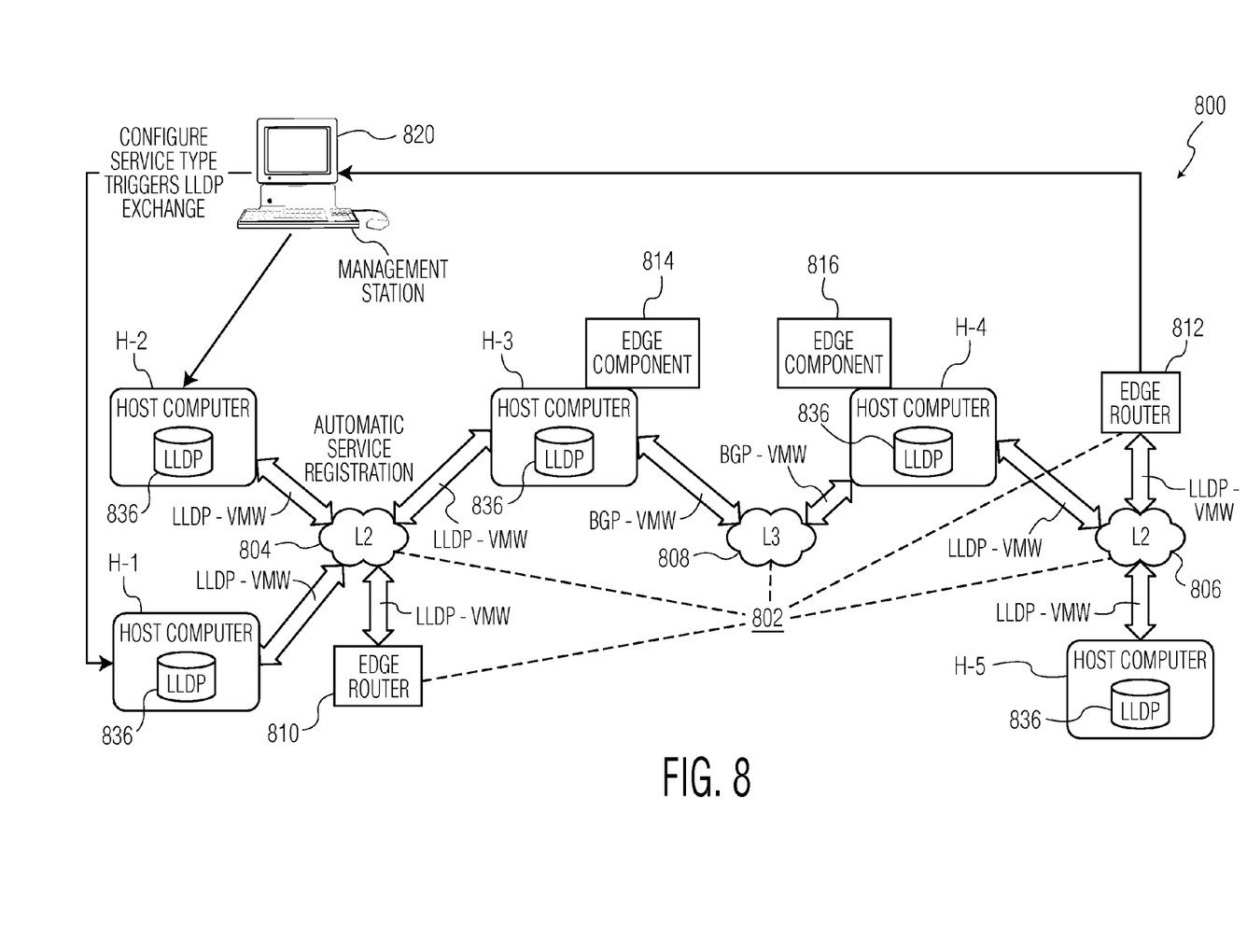
FIG. 8 is a block diagram of another embodiment of the distributed computer system depicted in FIG. 1.

Turning now to FIG. 8, an embodiment of the distributed service system 100 depicted in FIG. 1 is shown. As illustrated in FIG. 8, a distributed service system 800 includes a management station 820, host computers H-1, H-2, H-3, H-4, H-5 with LLDP modules 836, and a service network platform 802 with two Layer 2 service networks 804, 806, a Layer 3 service network 808, and two edge routers 810, 812. The management station 820 is an embodiment of the management computer 106 shown in FIG. 1. The host computers H-1, H-2, H-3, H-4, H-5 can be located in one or more clusters. Each of the host computers H-3, H-4 is connected to or includes an edge component 814 or 816 for interacting with the Layer 3 service network. Each host sends information of service provided by the host over an L2 network through LLDP by adding service TLV values into an LLDP data frame. Other hosts connected to an L2 network receive this service information and update their service databases. The management station can configure service type and trigger LLDP exchange between host computers. Each edge component converts service BGP data received from the L3 network into database records that can be used by LLDP or convert LLDP frames into BGP service data and transmit BGP service data to the L3 network.

Figure 9:
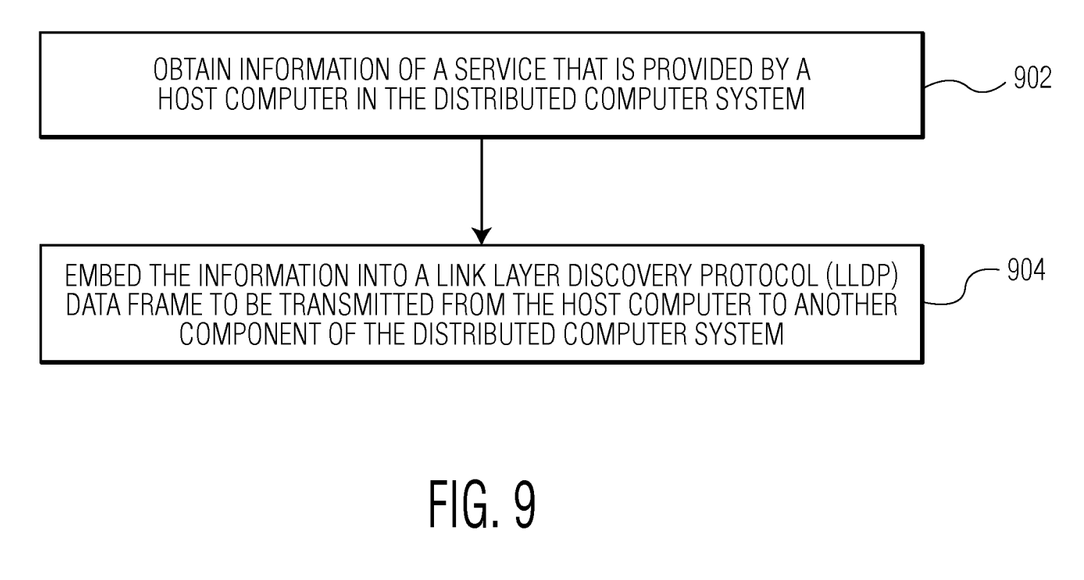
FIG. 9 is a flow diagram of a method for performing a service discovery on a distributed computer system in accordance with an embodiment of the invention.

A method for performing a service discovery on a distributed computer system in accordance with an embodiment of the invention is described with reference to a flow diagram of FIG. 9. The distributed computer system may be the same as or similar to the distributed computer system 100, 300, 400, or 800 depicted in FIG. 1, 3, 4, or 8. At block 902, information of a service that is provided by a host computer in the distributed computer system is obtained. At block 904, the information is embedded into a Link Layer Discovery Protocol (LLDP) data frame to be transmitted from the host computer to another component of the distributed computer system.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing a service discovery for a distributed computer system, the method comprising:
   obtaining information of a service that is provided by a host computer in the distributed computer system;
   embedding the information into a Link Layer Discovery Protocol (LLDP) data frame to be transmitted from the host computer to another component of the distributed computer system;
   intercepting the LLDP data frame at a network device; and
   at the network device, decoding the LLDP data frame and embedding the information into a Border Gateway Protocol (BGP) data frame.

2. The method of claim 1, wherein the service is provided by a client running on the host computer.

3. The method of claim 2, wherein the client includes a virtual machine.

4. The method of claim 2, wherein the information describes a virtual application service that is provided by the client running on the host computer.

5. The method of claim 4, wherein the virtual application service is a virtual proxy service or a virtual networking service.

6. The method of claim 1, wherein embedding the information into the LLDP data frame comprises embedding the information into the LLDP data frame as a set of Type-Length-Values (TLVs).

7. The method of claim 6, wherein embedding the information into the LLDP data frame comprises embedding the set of TLVs into a payload section of the LLDP data frame.

8. The method of claim 6, wherein the set of TLVs comprises a TLV type section, a TLV information string length section and a TLV information string.

9. The method of claim 1, further comprising:
   decoding the LLDP data frame to locate the information; and
   populating a database of a second host computer in the distributed computer system with the information.

10. The method of claim 1, further comprising:
    exchanging the LLDP data frame between the host computer and a second host computer in the distributed computer system over an L2 network; and
    at the second host computer, decoding the LLDP data frame to locate the information and populating a database of the second host computer with the information.

11. The method of claim 1, wherein the network device is situated between an L2 network and an L3 network.

12. A non-transitory computer-readable storage medium containing program instructions for performing a service discovery on a distributed computer system, wherein execution of the program instructions by one or more processors causes the one or more processors to perform steps comprising:
    obtaining information of a service that is provided by a host computer in the distributed computer system;
    embedding the information into a Link Layer Discovery Protocol (LLDP) data frame to be transmitted from the host computer to another component of the distributed computer system;
    intercepting the LLDP data frame at a network device; and
    at the network device, decoding the LLDP data frame and embedding the information into a Border Gateway Protocol (BGP) data frame.

13. The computer-readable storage medium of claim 12, wherein the network device is situated between an L2 network and an L3 network.

14. The non-transitory computer-readable storage medium of claim 12, wherein the service is provided by a virtual machine running on the host computer, and wherein the information describes a virtual application service that is provided by the client running on the host computer.

15. The non-transitory computer-readable storage medium of claim 12, wherein embedding the information into the LLDP data frame comprises embedding the information into a payload section of the LLDP data frame as a set of Type-Length-Values (TLVs).

16. The non-transitory computer-readable storage medium of claim 12, wherein the steps further comprise:
    decoding the LLDP data frame to locate the information; and
    populating a database of a second host computer in the distributed computer system with the information.

17. The non-transitory computer-readable storage medium of claim 12, wherein the steps further comprise:
    exchanging the LLDP data frame between the host computer and a second host computer in the distributed computer system over an L2 network; and
    at the second host computer, decoding the LLDP data frame to locate the information and populating a database of the second host computer with the information.

18. A distributed computer system for performing a service discovery comprising:
    a computer system including:
        a processor; and
        a service discovery module operably connected to the processor, wherein the service discovery module is configured to:
            obtain information of a service that is provided by a host computer in the distributed computer system; and
            embed the information into a Link Layer Discovery Protocol (LLDP) data frame to be transmitted from the host computer to another component of the distributed computer system; and
    a network device configured to intercept the LLDP data frame at a network device, the network device being further configured to decode the LLDP data frame and embed the information into a Border Gateway Protocol (BGP) data frame.

* * * * *